US012798117B2

(12) United States Patent
Fjeldheim et al.

(10) Patent No.: US 12,798,117 B2
(45) Date of Patent: Nov. 17, 2026

(54) PRODUCT HANDLING SYSTEM

(71) Applicant: Autostore Technology AS, Nedre Vats (NO)

(72) Inventors: Ivar Fjeldheim, Haugesund (NO); Ingvar Fagerland, Kolnes (NO); Trond Austrheim, Etne (NO); Jørgen Djuve Heggebø, Langhus (NO)

(73) Assignee: AutoStore Technology AS, Nedre Vats (NO)

( * ) Notice: Subject to any disclaimer, the term of this patent is extended or adjusted under 35 U.S.C. 154(b) by 195 days.

(21) Appl. No.: 18/565,401

(22) PCT Filed: Apr. 7, 2022

(86) PCT No.: PCT/EP2022/059204
§ 371 (c)(1),
(2) Date: Nov. 29, 2023

(87) PCT Pub. No.: WO2022/214578
PCT Pub. Date: Oct. 13, 2022

(65) Prior Publication Data

US 2024/0217117 A1 Jul. 4, 2024

(30) Foreign Application Priority Data

Apr. 9, 2021 (NO) .................................... 20210436

(51) Int. Cl.
*B25J 15/00* (2006.01)
*B25J 9/00* (2006.01)
*B65G 47/90* (2006.01)

(52) U.S. Cl.
CPC ......... *B25J 15/0047* (2013.01); *B25J 9/0093* (2013.01); *B65G 47/90* (2013.01); *B65G 2201/0258* (2013.01)

(58) Field of Classification Search
CPC ..... B25J 15/0047; B25J 9/0093; B65G 47/90; B65G 2201/0258
See application file for complete search history.

(56) References Cited

U.S. PATENT DOCUMENTS 4,340,249 A 7/1982 Bucklew
8,777,551 B1 * 7/2014 Widder .................. B65H 3/322 414/796.6

(Continued)

FOREIGN PATENT DOCUMENTS

CN 104290100 A 1/2015
CN 106272497 A * 1/2017 .......... B25J 15/0047

(Continued)

OTHER PUBLICATIONS

International Search Report issued in International Application No. PCT/EP2022/059204, mailed Jul. 14, 2022 (4 pages).

(Continued)

*Primary Examiner* — Gerald McClain
(74) *Attorney, Agent, or Firm* — Baker Botts L.L.P.

(57) ABSTRACT

A coupler includes a coupler frame, a handle, a first container gripper paddle, a second container gripper paddle, and an actuator system. The coupler frame includes a lower coupler frame face and an upper coupler frame face. The handle protrudes from the upper coupler frame face for releasable connection to an operative end of a robotic picking device. The first and second container gripper paddles are connected to the coupler frame for releasable connection to a container and arranged at opposite sides a centre plane oriented perpendicular to the lower coupler frame face. Each of the container gripper paddles includes a gripper protrusion located below the lower coupler frame face for insertion into a corresponding recess or aperture accessible within an inner volume of the container. The actuator system is for displacing the first and second con- (Continued)

tainer gripper paddles in opposite directions from the centre plane until the gripper protrusions have been removably inserted into the corresponding recesses or apertures.

15 Claims, 10 Drawing Sheets

(56) References Cited

U.S. PATENT DOCUMENTS

| | | | | |
|---|---|---|---|---|
| 2008/0193270 | A1 | 8/2008 | Yoshida et al. | |
| 2020/0223629 | A1 * | 7/2020 | Lindbo | G05B 19/4189 |
| 2024/0190652 | A1 * | 6/2024 | Fjeldheim | B65G 1/0464 |
| 2024/0308762 | A1 * | 9/2024 | Johannisson | B65G 1/0464 |
| 2025/0011081 | A1 * | 1/2025 | Austrheim | B65G 47/901 |

FOREIGN PATENT DOCUMENTS

| | | | | | |
|---|---|---|---|---|---|
| CN | 108214524 | A | | 6/2018 | |
| CN | 106272497 | B | | 11/2018 | |
| CN | 110606365 | A | * | 12/2019 | B65G 43/08 |
| DE | 3814914 | A1 | * | 11/1989 | B65D 5/4208 |
| DE | 4203823 | A1 | | 8/1993 | |
| DE | 4311146 | A1 | | 10/1994 | |
| EP | 0509499 | A1 | | 10/1992 | |
| EP | 2962962 | B1 | | 4/2018 | |
| JP | H07186082 | A | | 7/1995 | |
| JP | 2002087516 | A | | 3/2002 | |
| JP | 2004238147 | A | | 8/2004 | |
| JP | 2015085449 | A | | 5/2015 | |
| NO | 317366 | B1 | | 10/2004 | |
| WO | 9902436 | A1 | | 1/1999 | |
| WO | 2014090684 | A1 | | 6/2014 | |
| WO | 2015193278 | A1 | | 12/2015 | |
| WO | 2018146304 | A1 | | 8/2018 | |
| WO | 2019032651 | A1 | | 2/2019 | |
| WO | 2019206487 | A1 | | 10/2019 | |
| WO | 2021018649 | A1 | | 2/2021 | |

OTHER PUBLICATIONS

Written Opinion issued in International Application No. PCT/EP2022/059204; Dated Jul. 14, 2022 (6 pages).
International Preliminary Report on Patentability issued in International Application No. PCT/EP2022/059204; mailed Oct. 10, 2023 (7 pages).
Search Report issued in Norwegian Application No. 20210436; Dated Nov. 9, 2021 (2 pages).
Wang, Yanfang, Office Action in CN202280027222.5, mailed Jun. 29, 2025, 21 pages, The State Intellectual Property Office of the People's Republic of China, Beijing, China.
Le, Huy Anh, Office Action in VN1202307896, mailed Dec. 2, 2025, 4 pages, Intellectual Property Office of Vietnam, Hanoi, Vietnam.
Wang, Yanfang, Office Action in CN2022800272225, mailed Jan. 10, 2026, 16 pages, The State Intellectual Property Office of the People's Republic of China, Beijing, China.
Wang, Yanfang, Office Action in CN202280027222.5, mailed Apr. 30, 2026, 17 pages, The State Intellectual Property Office of the People's Republic of China, Beijing, China.
Tanaka, Tomoya, Office Action in JP2023561166, mailed Mar. 2, 2026, 10 pages, Japan Patent Office, Tokyo, Japan.

* cited by examiner

A

B

PRODUCT HANDLING SYSTEM

FIELD OF THE INVENTION

The present invention relates to a coupler for releasable coupling to a container and a product handling system using such a coupler. The present invention also relates to a method for handling such a container.

BACKGROUND AND PRIOR ART

FIG. 1 discloses an automated storage and retrieval system 100 with a framework/storage grid 101 supported on a floor/platform 700 and FIGS. 2, 3 and 4 disclose three different prior art container handling vehicles 200,300,350 suitable for operating on such a storage grid 101.

The framework 101 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework 101 of the automated storage and retrieval system 100 comprises a rail system 108 arranged across the top of the framework 101, on which rail system 108 a plurality of container handling vehicles 200,300,350 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 200,300,350 in a first direction X across the top of the framework 101, and a second set of parallel rails 111 arranged perpendicular to the first set of rails 110 to guide movement of the container handling vehicles 200,300,350 in a second direction Y which is perpendicular to the first direction X. Containers 106 stored in the storage columns 105 are accessed by the container handling vehicles 200,300,350 through access openings 112 in the rail system 108. The container handling vehicles 200,300,350 can move laterally above the storage columns 105, i.e. in a plane which is parallel to the horizontal X-Y plane.

The upright members 102 of the framework 101 may be used to guide the storage containers 106 during raising of the containers out from, and lowering of the containers into, the columns 105. The stacks 107 of containers 106 are typically self-supportive.

Referring to FIGS. 2-4, each prior art container handling vehicle 200,300,350 comprises a vehicle body 201,301,351 and first and second sets of wheels 202*a*, 202*b*, 302*a*, 302*b*, 352*a*, 352*b* which enable the lateral movement of the container handling vehicles 200,300,350 in the X direction and in the Y direction, respectively. In FIGS. 2 and 3 two wheels in each set of four wheels are visible, while in FIG. 4, three wheels in each set of four wheels are visible. The first set of wheels 202*a*, 302*a*, 352*a* is arranged to engage with two adjacent rails of the first set 110 of rails, and the second set of wheels 202*b*,302*b*,352*b* is arranged to engage with two adjacent rails of the second set 111 of rails. At least one of the sets of wheels 202*a*, 302*a*, 352*a*, 202*b*, 302*b*, 352*b* can be lifted and lowered, so that the first set of wheels 202*a*, 302*a*,352*a* and/or the second set of wheels 202*b*, 302*b*,352*b* can be engaged with the respective set of rails 110, 111 at any one time.

Each prior art container handling vehicle 200,300,350 also comprises a lifting device 210,360 for vertical transportation of storage containers 106, e.g. raising a storage container 106 from, and lowering a storage container 106 into, a storage column 105. The lifting device 210,360 comprises one or more gripper elements 362 which are adapted to engage a storage container 106, and which gripping elements 362 can be lowered from the vehicle 200,300,350 so that the position of the gripping elements 362 with respect to the vehicle body 201,301,351 can be adjusted in a third direction Z orthogonal to the first direction X and the second direction Y. The lifting device 210,360 of the container handling vehicles 200,350 are shown in FIG. 2 and FIG. 4. The lifting device of the container handling vehicle 300 shown in FIG. 3 is located within the vehicle body 301.

Conventionally, and also for the purpose of this application, Z=1 identifies the uppermost 1210 layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=19, Y=1 and Z=3. The container handling vehicles 200,300 can be said to travel in layer Z=0, and each storage column 105 can be identified by its X and Y coordinates.

The possible storage positions within the framework/storage grid 101 are referred to as storage cells. Each storage column 105 may be identified by a position in an X- and Y-direction, while each storage cell may be identified by a container number in the X-, Y and Z-direction.

Each prior art container handling vehicle 200,300,350 comprises a storage compartment or space for receiving and stowing a storage container 106 when transporting the storage container 106 across the rail system 108.

The storage space may be below a cantilever construction of a container handling vehicle 200 as shown in FIG. 2. Such a vehicle is described in detail in e.g. NO317366, the contents of which are also incorporated herein by reference.

In another configuration, the storage space may comprise a cavity arranged internally within the vehicle body 301,351 as shown in FIGS. 3 and 4 and as described in e.g. WO2015/193278A1 and WO2019/206487A1, the contents of which are incorporated herein by reference.

The container handling vehicles 300 shown in FIG. 3 may have a centrally arranged cavity and a footprint that covers an area with dimensions in the X and Y directions which is generally equal to the lateral extent of a storage column 105, e.g. as described in WO2015/193278A1, the contents of which are incorporated herein by reference.

Alternatively, the cavity container handling vehicles 350 may have a footprint which is larger than the lateral area defined by a storage column 105 as shown in FIGS. 1 and 4, and as is disclosed in e.g. WO2014/090684A1, EP2962962 or WO2019/206487A1.

Note that the term 'lateral' used herein may mean 'horizontal'.

FIG. 1 shows container handling vehicles with a plurality of cantilever vehicles 200 (FIG. 3) and a plurality of cavity vehicles 350 (FIG. 4) which extend beyond the footprint of a single storage column 105.

The rail system 108 typically comprises rails 110,111 with grooves in which the wheels of the vehicles run. Alternatively, the rails 110, 111 may comprise upwardly protruding elements, where the wheels of the vehicles comprise flanges to prevent derailing. These grooves and upwardly protruding elements are collectively known as tracks. Each rail 110,111 may comprise one track, or each rail 110,111 may comprise two parallel tracks.

WO2018/146304, the contents of which are incorporated herein by reference, illustrates a typical configuration of rail system 108 comprising rails and parallel tracks in both X and Y directions.

In the framework 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 200,300,350 to drop off and/or pick up storage containers 106 so that they can be transported to an access station (not shown) where the storage containers 106 can be accessed from outside of the framework 100 or transferred out of or into the framework 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a drop-off port column where the container handling vehicles 200,300 can drop off storage containers 106 to be transported to an access and distribution station 500, and the second port column 120 may be a dedicated pick-up port column where the container handling vehicles 200,300,350 can pick up storage containers 106 that have been transported from the access and distribution station.

The access and distribution station may typically be a picking or a stocking station where product items are removed from or positioned into the storage containers 106. In a picking or a stocking station, the storage containers 106 are normally not removed from the automated storage and retrieval system 100, but are returned into the framework 100 again once accessed. A port can also be used for transferring storage containers to another storage facility (e.g. to another framework or to another automated storage and retrieval system), to a transport vehicle (e g a train or a lorry), or to a production facility.

When a target storage container 106' stored in one of the columns 105 disclosed in FIG. 1 is to be accessed, one of the container handling vehicles 200,300 is instructed to retrieve the target storage container 106' from its position and transport it to the drop-off port column 119. This operation involves moving the container handling vehicle 200,300,350 to a location above the storage column 105 in which the target storage container 106' is positioned, retrieving the storage container 106 from the storage column 105 using the container handling vehicle's 200,300,350 lifting device 210, 360, and transporting the storage container 106 to the drop-off port column 119. If the target storage container 106' is located deep within a stack 107, i.e. with one or a plurality of other storage containers 106 positioned above the target storage container 106', the operation also involves temporarily moving the above-positioned storage containers 106 prior to lifting the target storage container 106' from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 100 may have container handling vehicles specifically dedicated to the task of temporarily removing storage containers from a storage column 105. Once the target storage container 106' has been removed from the storage column 105, the temporarily removed storage containers 106 can be repositioned into the original storage column 105. However, the removed storage containers 106 may alternatively be relocated to other storage columns 105.

When a storage container 106' is to be stored in one of the columns 105, one of the container handling vehicles 200, 300,350 is instructed to pick up the storage container 106' from the pick-up port column 120 and transport it to a location above the storage column 105 where it is to be stored. After any storage containers 106 positioned at or above the target position within the storage column stack 107 have been removed, the container handling vehicle 200,300,350 positions the target storage container 106' at the desired position. The removed storage containers 106 may then be lowered back into the storage column 105, or relocated to other storage columns.

For monitoring and controlling the automated storage and retrieval system 100, e.g. monitoring and controlling the location of respective storage containers 106 within the framework 101, the content of each storage container 106, and the movement of the container handling vehicles 200, 300,350 so that a desired storage container 106' can be delivered to the desired location at the desired time without the container handling vehicles 200,300,350 colliding with each other, the automated storage and retrieval system 100 comprises a control system 600 which typically is computerized and which typically comprises a database for keeping track of the storage containers 106.

To facilitate the storage and retrieval of inventory and/or other product items 80 stored with the storage containers 106, the product items 80 may be arranged in dedicated delivery containers 20 for handling by systems outside the above described framework 101.

Cubic storage systems of the type shown in FIG. 1 typically perform the consolidation of product items 80 from storage containers 106 to delivery containers 20 outside the framework, which again requires large external areas for temporary storage of consolidated delivery containers. Furthermore, each of the customer orders may include several different product items. The availability of such temporary storage is often low since it is of importance for operational and economical reasonings that the space taken up by the storage system is as large as possible.

An objective of the present invention is therefore to provide a system and a method that allows handling of consolidated delivery containers stored in storage containers in an efficient manner.

At least for some embodiments, another objective of the present invention is to minimize the need for dedicated external areas for temporary storage of delivery containers.

SUMMARY OF THE INVENTION

The invention is set forth in the independent claims and the dependent claims describe certain optional features of the invention.

In a first aspect, the invention concerns a coupler adapted for releasable connection to a container. The coupler comprises a coupler frame comprising a lower coupler frame face and an upper coupler frame face, a handle/connection device protruding from the upper coupler frame face for releasable connection to an operative end/part of a robotic picking device and a gripping mechanism for releasable connection to a container.

The gripping mechanism may comprise a first and a second container gripper paddle/element connected to the coupler frame, wherein the paddles are arranged at opposite sides of a centre plane CP oriented perpendicular to, and intercepting a centre point of, the lower coupler frame face. Further, the paddles may be arranged at equal distances from the centre plane CP.

Each of the container gripper paddles may comprise a gripper protrusion such as a ledge, a rib and/or a fold located below the lower coupler frame face for insertion into a corresponding recess or aperture accessible within an inner volume of the container.

The coupler preferably also comprises an actuator system for displacing the first and second container gripper paddles in opposite direction from the centre plane CP until the gripper protrusions have been removably inserted into the corresponding recesses or apertures.

In an advantageous exemplary configuration, the actuator system comprises a motor, a control system configured to control operation of the motor and a displacement mechanism interconnecting the motor and the container gripper paddles. The motor is preferably arranged at or near the centre plane CP, for example at or near the centre point of the frame. However, the motor may be placed anywhere on the coupler as long as it can provide the required displacement. Another possible arrangement may for example be above the upper coupler frame face in order to avoid possible interference with items within the container.

The displacement mechanism may for example comprise a first link/arm connected at one end at least indirectly to the motor and the other end to one of the first and second container gripper paddles and a second link/arm connected at one end at least indirectly to the motor and the other end to the other of the first and second container gripper paddles, and wherein the motor is configured to displace the first and second links. In a specific arrangement of the links, the link' vector components projected onto the lower coupler frame face are oriented in opposite directions. Note that a link can be interpreted as any link between the motor and the paddles/gripping mechanism that can cause the protrusions to enter the corresponding recesses/holes within the container.

The actuator system may comprise a rotary element such as a disc connecting the links to a rotary shaft of the motor. Furthermore, the motor, the rotary element and the links may in this exemplary configuration be arranged such that the desired opposite directed displacements of the first and second links are achieved by rotating the rotary element clockwise or counterclockwise between 0 degrees and 180 degrees, more preferably between 70 degrees and 100 degrees, for example 90 degrees.

In another advantageous exemplary configuration, the coupler further comprises a container abutment face for abutting an upper edge of the container. The actuator system may in this configuration be arranged such that at least part of the actuator system, and preferably the entire actuator system, stays above the container abutment face during operation.

In yet another advantageous exemplary configuration, each of the container gripper paddles comprises an upper end pivotably connected to the coupler frame. Other retractable displacement means may however be envisaged such as resilient coupling systems.

In yet another advantageous exemplary configuration, the lower coupler frame face is rectangular with a width $W_C$ and a length $L_C$, wherein the gripper protrusions are aligned on a centre axis $C_H$ parallel to the lower coupler frame face and centered along the face's width $W_C$ or length $L_C$.

In yet another exemplary configuration, the coupler further comprises a plurality of container guiding plates connected, which are preferably resilient, to the coupler frame for preventing movements of the coupler in directions parallel to the lower coupler frame face when at least a part of the container guiding plates have been inserted into the inner volume of the container during use. The upper end of each of the container guiding plates may for example be fixed to the lower coupler frame face.

Furthermore, the plurality of container guiding plates may be distributed on each of four sides of the rectangular area and spaced such that an outer rectangular boundary intersecting the container guide plates forms a cross sectional area parallel to the lower lifting frame face which is equal, or near equal, to a cross sectional area of an opening of the container. If the particular application with this container is a delivery container intended to be stored within a storage container, the cross sectional area set by the plurality of container guiding plates should be approximately the cross sectional area of the opening of the delivery container, but smaller than the corresponding cross sectional area of the storage container.

In yet another advantageous exemplary configuration, the coupler further comprises one or more container sensors configured to sense when the lower coupler frame face is in contact with, and/or in proximity to, an opening frame of the container. The end of the container sensors may be arranged at identical vertical positions, and/or acting as the above-mentioned container abutment face(s), preferably distributed at the outer boundary of the coupler frame such as its four corners. Further, the container sensor(s) may also comprise a transmitter allowing transmittal of sensed signals to a remote control system.

The container sensor(s) may be in form of a capacitive sensor (mutual capacitance and/or self-capacitance) for registering direct contact, or proximity, with the frame of the container.

In yet another advantageous exemplary configuration, the handle comprises a resilient mechanism such as springs, allowing damping motion between the operative end of the robotic picking device and the coupler after connection.

In a second aspect, the invention concerns a product handling system comprising a storage and retrieval system suitable for storing storage containers, for example in stacks, a control system, a robotic picking device in signal communication with the control system, a coupler comprising container gripping means for releasable connection to a delivery container having a size and form allowing storage within the storage containers and an access and a distribution station configured to deliver one or more storage containers from within the storage and retrieval system.

The coupler may be in accordance with any one of the above described configurations.

Further, the robotic picking device may comprise a robotic base, a first robotic segment connected to the robotic base and an operative end connected to the coupler and at least indirectly to the first robotic segment.

The robotic base may for example be mounted to the floor onto which the storage system is supported.

The operative end is in this second aspect arranged at an adjustable gripper distance $R_G$ from the robotic base. The robotic base is positioned to allow the operative end to be moved to a position at least within reach of the storage container(s) to be delivered to the access and distribution station.

The robotic picking device is preferably arranged outside, and adjacent to, the storage volume of the storage and retrieval system.

In an advantageous configuration of the second aspect, the operative end comprises a robotic gripper configured to releasably grip the coupler, preferably via the handle.

In another advantageous configuration of the second aspect, the first robotic segment is

- rotatably connected to the robotic base with a rotational robotic base axis $C_{RV}$ preferably perpendicular to a picking device platform or storage and retrieval system floor or
- movably connected to the robotic base along at least a direction parallel to the floor onto which the storage and retrieval system is supported and/or the robotic picking device platform or
- a combination thereof.

In yet another advantageous configuration of the second aspect, the access and distribution station comprises a storage system access opening through which a storage container may be transported between a storage location within the storage and retrieval system and an external area of the storage and retrieval system. The station may further comprise a conveyor having one end arranged adjacent to the storage system access opening. For this configuration, the robotic picking device may be configured such that the coupler connected to the robotic gripper/operative end may be positioned at a location and orientation allowing retrieval of a delivery container from within the storage container located within or at the storage system access opening, for example using a multi-joint robotic picking device, and that the retrieved delivery container may be placed onto the conveyor.

The conveyor may involve two conveyor belts for transporting delivery containers to and from the storage system access opening.

In yet another advantageous configuration of the second aspect, the storage and retrieval system comprises

- a framework structure comprising a plurality of vertical upright members defining a plurality of storage columns suitable for storing stacks of storage containers and at least one port column suitable for transporting a storage container to the access and distribution station,
- a rail system arranged on the framework structure, the rail system comprising perpendicular tracks, the intersections of which form a grid having grid cells defining grid openings into the plurality of storage columns and preferably also the at least one port column and
- a remotely operated vehicle comprising drive means configured to travel along the rail system and a storage container lifting device for storing and retrieving storage containers through the grid openings.

In a third aspect, the invention concerns a method for handling a delivery container by use of a product handling system in accordance with any of the configurations mentioned above.

The method comprises the steps of

- A. moving the operative end of the robotic picking device, with the coupler connected thereto, to a position in which the coupler may be connected to the delivery container,
- B. releasably connecting the coupler to the delivery container and
- C. raising the coupler with the delivery container by raising the operative end of the robotic picking device.

In an advantageous operation, the method comprises, prior to step A, the step of

- releasably connecting the robotic gripper/operative end to the coupler, preferably via the handle/connection device.

In another advantageous operation, when the delivery container to be connected is stored within a storage container, the method comprises the steps of

- transporting, prior to step A, the storage container with the delivery container stored therein from the storage and retrieval system to an external area through a storage system access opening and
- raising, during step C, the operative end/robotic gripper such that a lowermost part of the delivery container is higher than the uppermost part of the storage container.

In yet another advantageous operation, the method comprises the steps of

- placing, after step C, the delivery container onto a conveyor having one end arranged adjacent to the storage system access opening and
- transporting the delivery container, by use of the conveyor, away from the storage system access opening.

In yet another advantageous operation, the method further comprises the step of

- transporting an incoming delivery container to the storage system access opening, for example by use of the conveyor,
- moving the operative end/robotic gripper with the connected coupler to a position in which the coupler may connect to the incoming delivery container,
- releasably connecting the coupler to the incoming delivery container,
- moving the incoming delivery container to a position above a storage container to be stored within the storage and retrieval system and
- placing the incoming delivery container into the storage container.

In a fourth aspect, the invention concerns a computer-readable medium having stored thereon a computer program comprising instructions to execute the method steps as described above.

BRIEF DESCRIPTION OF THE DRAWINGS

The following drawings depict exemplary embodiments of the present invention and are appended to facilitate the understanding of the invention. However, the features disclosed in the drawings are for illustrative purposes only and shall not be interpreted in a limiting sense.

FIG. 5B shows the coupler in a released and connected position, respectively.

FIG. 10B shows the delivery container in a stored and lifted position, respectively.

DETAILED DESCRIPTION OF THE INVENTION

Figure 1:
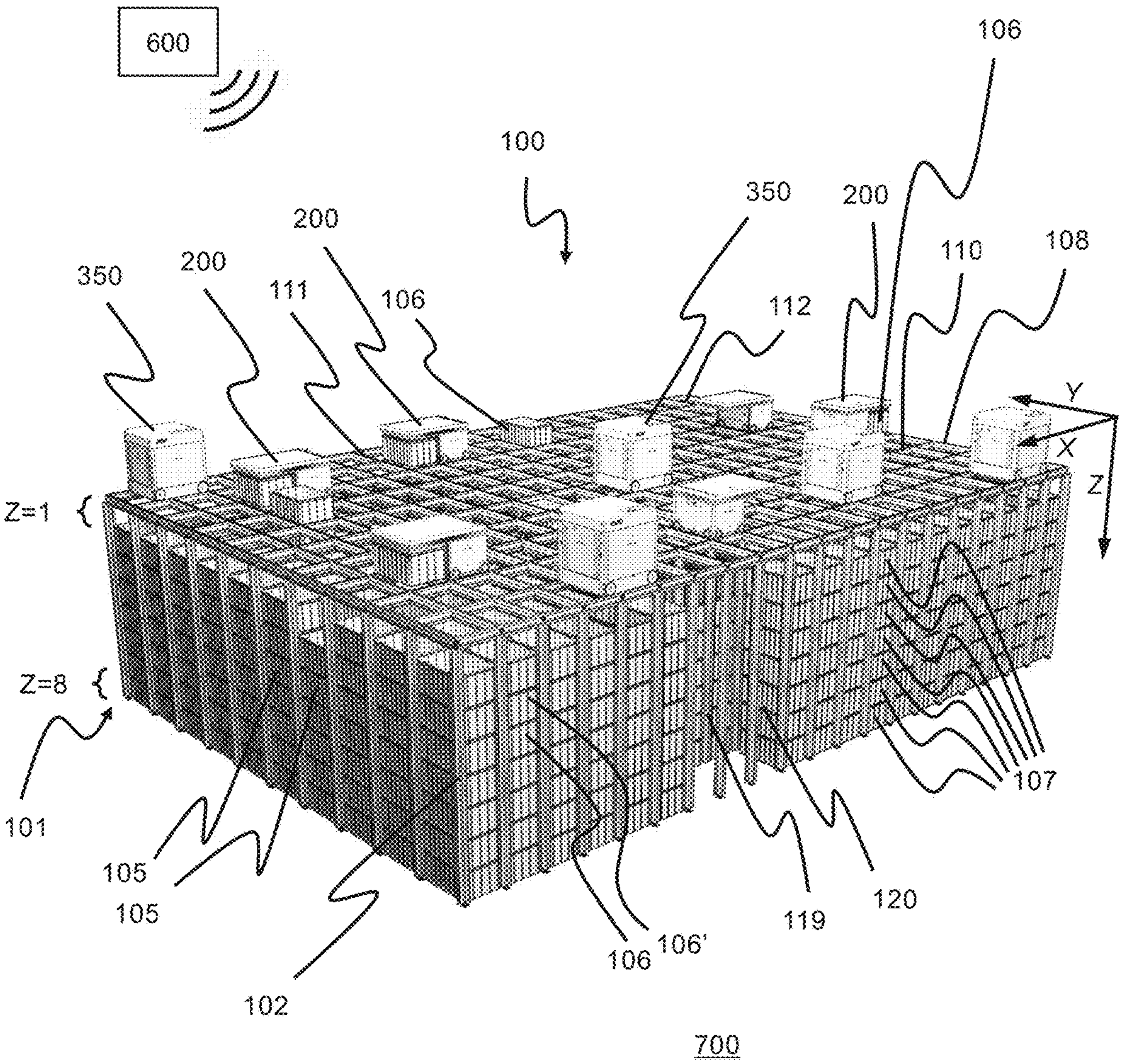
Fig. 1 (Prior Art)
FIG. 1 is a perspective view of an automated storage and retrieval system.
Figure 2:
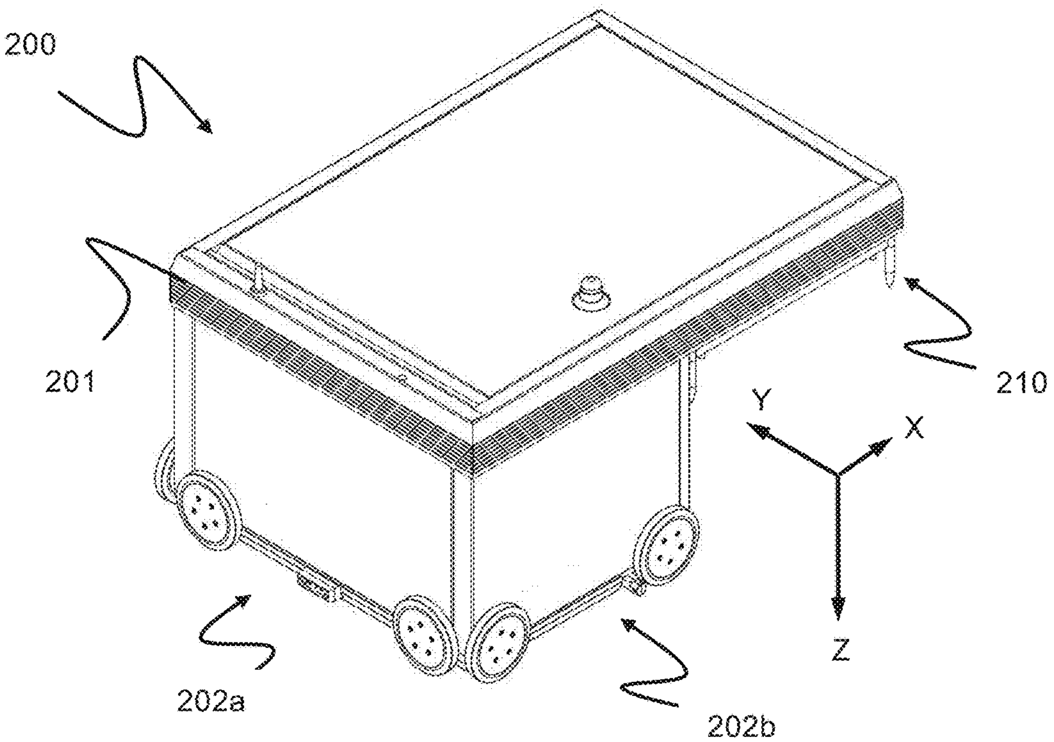
Fig. 2 (Prior Art)
FIG. 2 is a perspective view of a prior art container handling vehicle having a cantilever for carrying storage containers underneath.
Figure 3:
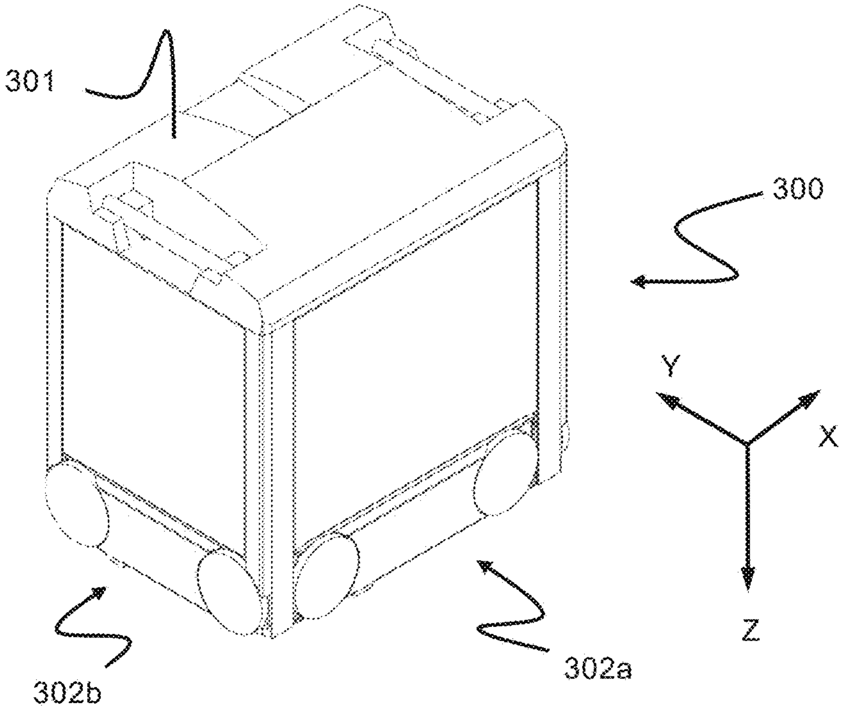
Fig. 3 (Prior Art)
FIG. 3 is a perspective view of a prior art container handling vehicle having a centrally arranged cavity for carrying storage containers therein.
Figure 4:
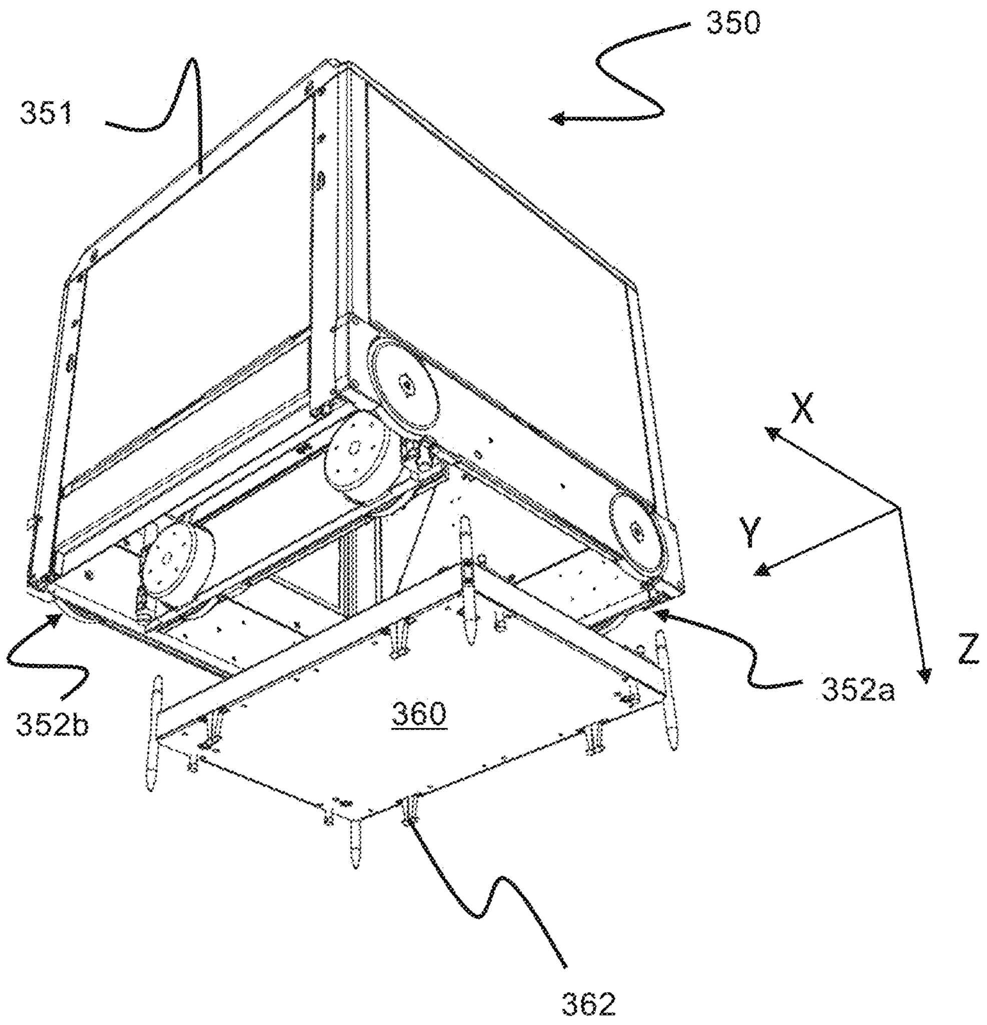
Fig. 4 (Prior Art)
FIG. 4 is a perspective view of a prior art container handling vehicle having an internally arranged cavity for carrying storage containers therein, wherein the cavity is offset from center relative to the X-direction.

In the following, different embodiments will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

Figure 5:
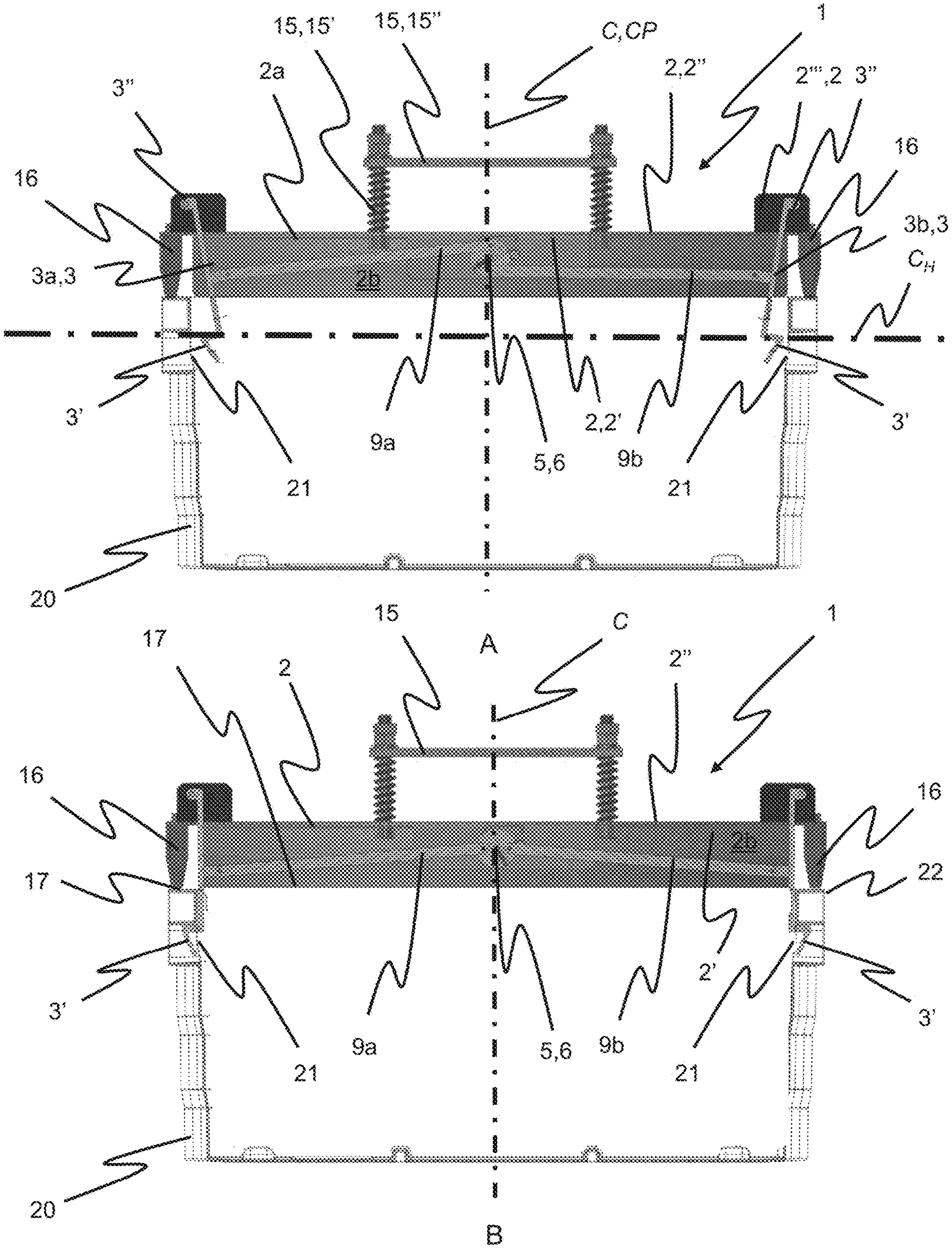
FIG. 5 is a side view of a coupler with a delivery container, the coupler being in accordance with a first embodiment of the invention connected thereon, where FIG. 5A
Figure 6:
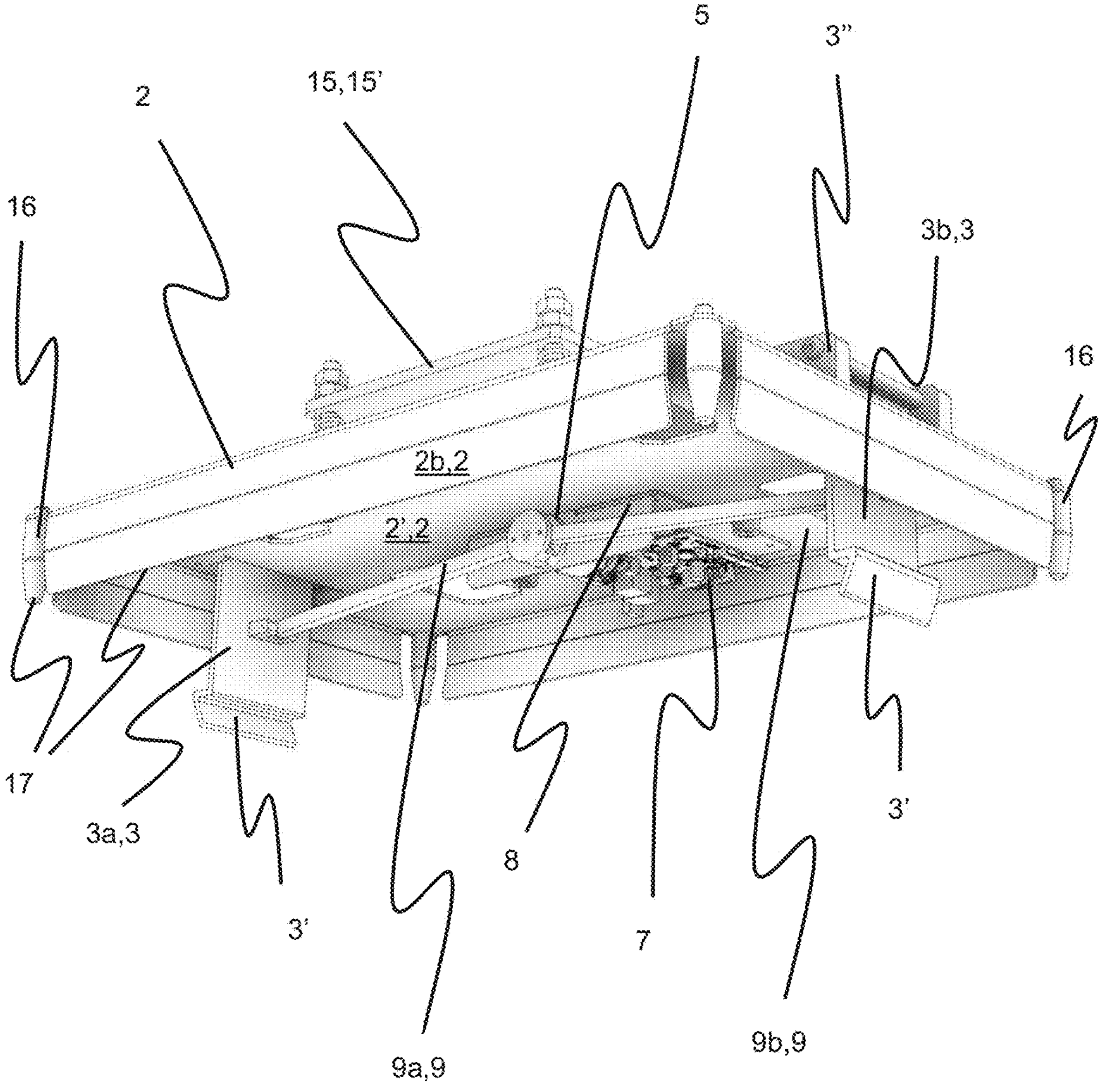
FIG. 6 is a perspective side view of the coupler shown in FIG. 5.

FIGS. 5 and 6 show an embodiment where a tote contacting face 17 of a coupler 1 is abutting an opening frame/rim 22 of a delivery container 20, hereinafter called a tote. In the particular embodiment depicted in the figures, the coupler 1 includes a coupler frame 2 comprising a rectangular, horizontal coupler plate 2*a* having an lower coupler frame face 2' and an upper coupler frame face 2'', tote abutment sensors 16 extending downwards from the corners of the coupler plate 2*a* and angled coupler plates 2*b* arranged between the coupler plate's corners and extending downwards from rims/boundaries of the coupler plate 2*a*.

The purpose of the abutment sensors 16 is to register abutment with the rim 22 of the tote 20 and may e.g. be mechanical sensors such as pressure activated sensors or electronical proximity sensors. In the former case, the extent of the tote abutment sensors 16 should be equal or longer than the extent of the angled coupler plates 2*b*, thereby ensuring that the tote abutment sensors 16 exerts pressure on the rim 22 at contact and/or detect proximity.

Furthermore, the coupler frame 2 comprises two upper blocks 2''' fixed on opposite sides on the coupler plate 2*a*.

In the particular case where the tote 20 should be picked up from, or inserted into, a storage container 106, hereinafter called a bin, being higher and slightly wider than the tote 20, at least part of the angled coupler plates 2*b* may advantageously be slanted inwards in order to avoid undesired abutment between the plates' 2*b* rim and an upper rim of the bin 106 defining its opening.

The coupler 1 further comprises two container gripper paddles 3 (a first paddle 3*a* and a second paddle 3*b*), hereinafter called tote paddles, where each tote paddle 3*a*,3*b* has a gripper protrusion 3' at the lower end such as a ledge, rib or fold, and where the upper end 3'' of each paddle 3 is attached pivotally and/or resiliently to respective upper blocks 2'''. If the upper blocks 2''' are arranged on the upper face 2'' as depicted in FIGS. 5 and 6, the coupler plate 2*a* should be designed with through-going openings having a position and size to allow sufficient horizontal movements of the tote paddles 3. Moreover, the tote paddles 3 are arranged such that the protrusions 3' are located at vertical height(s) of recesses/apertures 21 within inner walls of the tote 20 when the coupler frame 2 is abutting the opening frame/upper rim 22 of the tote 20.

An actuator system 5-9, which also forms part of the coupler 1, is arranged at least partly within the volume set by the lower face 2'' of the horizontal coupler plate 2*a* and the angled coupler plates 2*b*. The actuator system 5-9 is configured such that it may displace the first and second tote paddles 3*a*,3*b* in opposite directions by remote operation. The actuator system 5-9 may alternatively be protruding partly or fully from said volume.

In the particular embodiment shown in FIGS. 5 and 6, the actuator system 5-9 includes a motor 5, a control system 7 allowing control of the operation of the motor 5 and signal communication with a control system 600, a rotary disc 6 connected to the motor 5 and two links/displacement arms 9*a*,9*b* connecting the rotary disc 6 to each of the tote paddles 3*a*, 3*b*.

The motor 5, the rotary disc 6 and the control system 7 are fixed to the lower face 2' of the coupler plate 2*a* by a motor support 8 in the form of an angle bracket. The motor 5 may for example be a DC motor.

The two links/displacement arms 9*a*,9*b* are in FIGS. 5 and 6 configured and sized in the following way:

A first end of the first link 9*a* and a first end of the second link 9*b* are pivotably connected to the rotary disc 6 at opposite sides of the disc's 6 horizontal rotational axis, while a second end of the first link 9*a* and a second end of the second link 9*b* are pivotably connected to the first tote paddle 3*a* and the second tote paddle 3*b*, respectively.

The positions, angles and lengths of the tote paddles 3 are adjusted such that the protrusions 3' are aligned at the same vertical level as the gripping structure (recesses/apertures) 21 of the tote 20 when in the position shown in FIG. 5.

Furthermore, the actuator system 5-9 is configured such that the horizontal deflections of the tote paddles 3 are sufficient to switch the tote paddles 3 between a lock position where the protrusions 3' are inside the respective recesses/apertures 21 and a release position where the protrusions 3' are outside the respective recesses/apertures 21. In this way, a controllable gripping/releasing operation of the tote 20 is achieved.

As best seen in FIG. 5A and FIG. 5B, the particular configuration with opposite positioned first ends on the rotary disc 6 result in an equal displacement of the links 9*a*,9*b*, and a corresponding equal pivoting of the tote gripper paddles 3*a*,3*b*, when the motor 5 rotates the rotary disc 6 an angle necessary for achieving the desired gripping of the tote 20, preferably within a range of 70-100°, for example 90°.

The coupler 1 further comprises a handle 15 arranged on top of the coupler frame 2. In the particular embodiment shown in FIGS. 5-6, the handle 15 comprises vertical suspensions 15' attached at one end to the coupler frame 2 and a horizontal handle plate 15'' to the opposite end.

Figure 7:
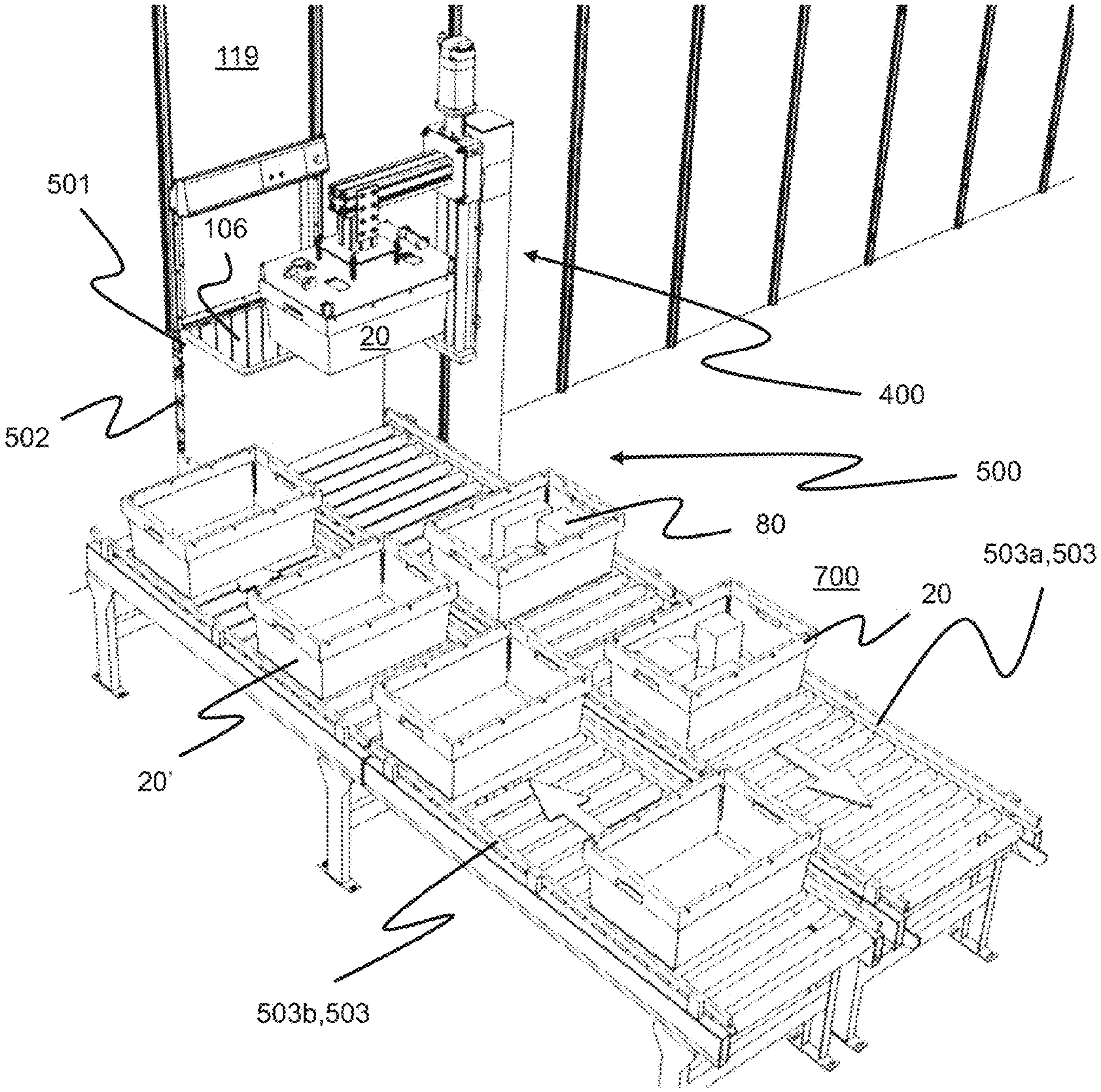
FIG. 7 is a perspective view of a product handling system for handling delivery containers using a coupler in accordance with a first embodiment of the invention.
Figure 8:
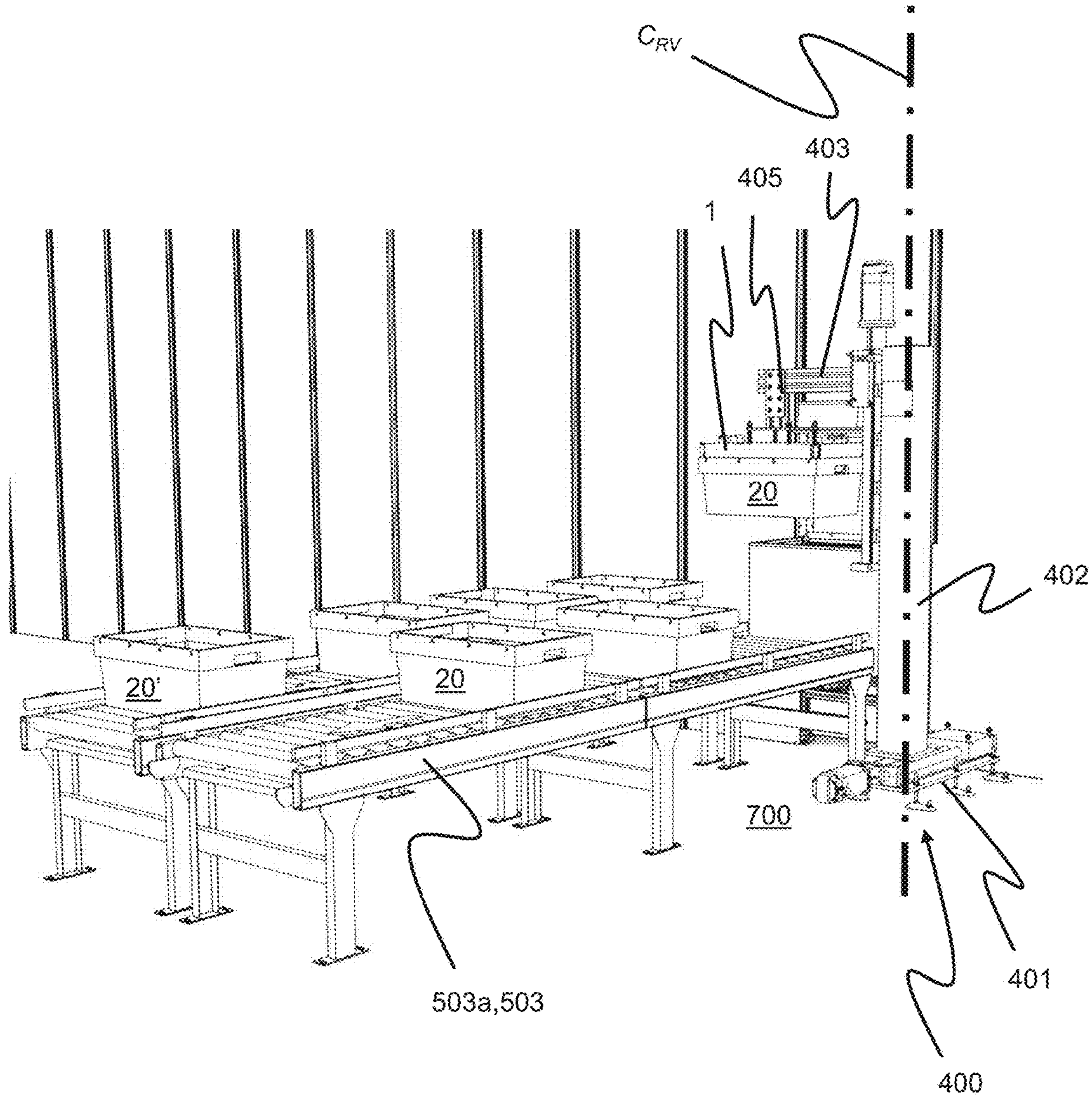
FIG. 8 is another perspective view of the inventive product handling system of FIG. 7.

FIGS. 7-8 show an example of a practical use of the above described coupler 1 in accordance with a first embodiment of a product handling system arranged adjacent a drop-off port column 119 of an automated storage and retrieval system 100.

Alternatively, or in addition, such a product handling system may be arranged on top of the automated storage and retrieval system 100, i.e. next to, or within, the rail system shown in FIG. 1.

This first embodiment product handling system comprises a robotic picking device 400 capable of picking up totes 20 inside bins 106 by use of the coupler 1, an access and distribution station 500 and a control system 600 enabling remote operation of the product handling system via suitable transmitters and sensors (not shown).

Figure 10:
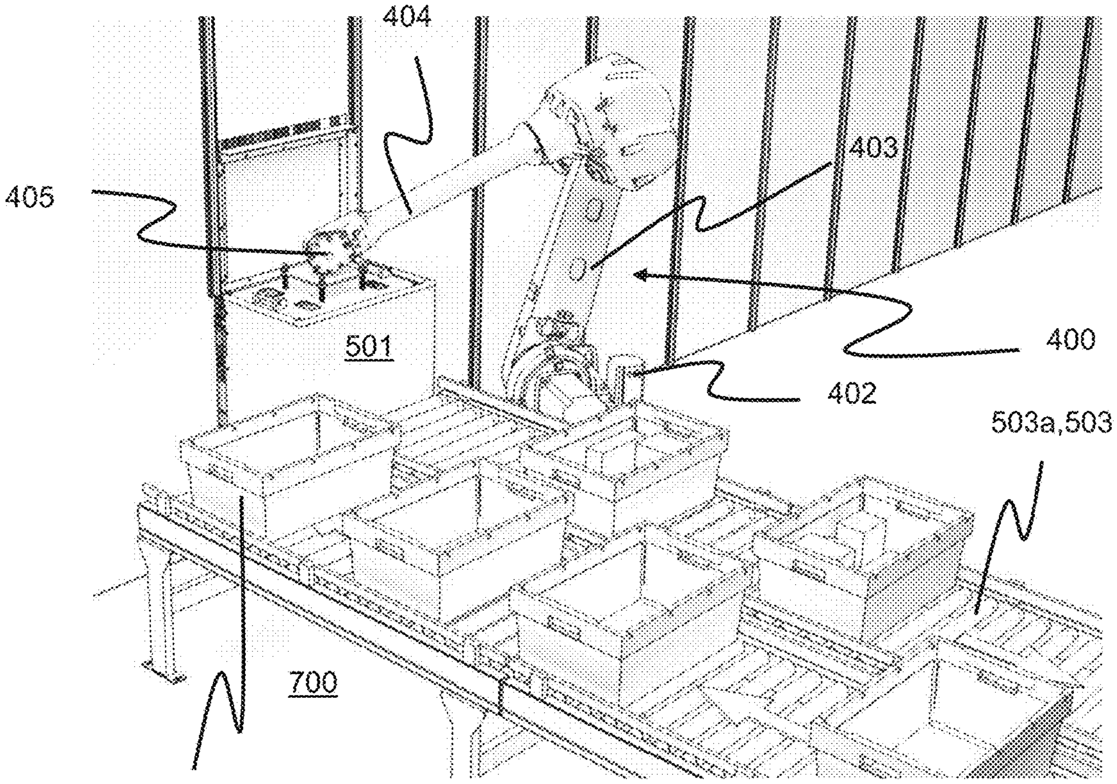
FIG. 10 are perspective views of a second example of a product handling system for handling delivery containers, wherein FIG. 10A
Figure 10:
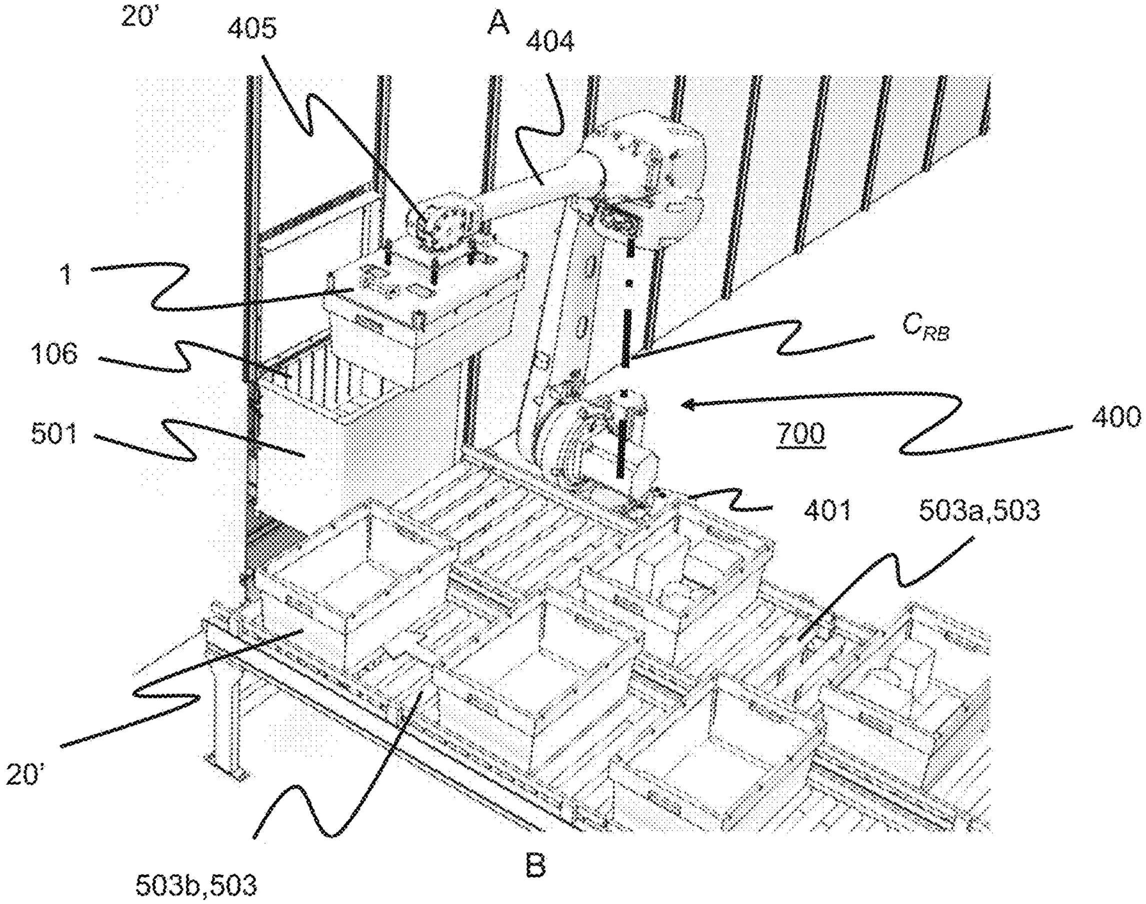

The station 500 shown in FIGS. 7,8 and 10 includes a container basket 501 configured to temporarily store/hold a bin 106 and a storage system access opening 502 through which the container basket 501 may be guided, for example by use of a dedicated container basket displacement mechanism (not shown).

The station 500 may further include a conveyor system 503 located at least partly outside the framework 101 of storage and retrieval system 100. The conveyor system 503 may comprise a first conveyor belt 503*a* and a second conveyor belt 503*b* arranged parallel to each other. As illustrated in FIG. 7, by placing an end of each of the conveyor belts 503*a,b* next to the access opening 502, simultaneous transport of totes 20 to and from the container basket 501 is made possible, thereby increasing the overall efficiency of the product handling system. In FIG. 7, incoming totes are marked with reference sign 20'.

In the alternative configuration where the robotic picking device 400 is arranged at the level of the rail system 108, such container basket 501 and access opening 502 would not be present since the robotic picking device 400 handles the totes 20 directly from within the respective bins 106. Any conveyor belts 503 may in such configurations extend between the rail system 108 and the tote delivery area such as the floor of the storage and retrieval system 100.

With particular reference to FIG. 8, the robotic picking device 400 comprises in this first embodiment

- a robotic base 401 fixed on a platform/floor 700 or on/at the rail system 108,
- a first robotic segment 402 connected with a vertical orientation to the robotic base 401 such that controlled horizontal displacement in direction to/from the storage system 100, or along one direction of the rail system 108, is achieved,
- a second robotic segment 403 connected with a horizontal orientation to the first robotic segment 402 such that controlled vertical displacement is enabled (i.e. perpendicular to the floor 700/rail system 108) and
- an operative end 405 connected at least indirectly to the second robotic segment 403.

The operative end/robotic gripper 405 is further configured to allow connection to the handle 15 of the coupler 1.

The orientations vertical/horizontal is hereinafter measured relative to the platform/floor 700 of the robotic base 401 when the robotic picking device 400 is arranged at the lower end of the drop-off port column 119 or relative to the rail system 108 when the robotic picking device 400 is arranged thereon. Note that the conveyor system 503 and/or the framework 101 of the storage volume of the storage and retrieval system 100 may be supported on the same platform/floor 700 or alternatively to other platforms arranged at different vertical levels. Note also that the rail system 108 and the platform/floor 700 are normally oriented parallel to each other.

The controlled horizontal and vertical displacements may be achieved by known displacement devices such as motorized linear actuators and/or hydraulic cylinders. The connecting end of the second robotic segment 403 may for example be guided along vertical rods forming part of the first robotic segment 402.

The robotic picking device 400 is further arranged such that the operative end 405 may be maneuvered to a position centered above the container basket 501 or alternatively above a tote containing bin 106 on top of a stack 107 in a storage column within reach of the operative end 405.

With the particular setup described above, and with the coupler 1 connected to the operative end 405 of the robotic picking device 400, any tote 20 stored within respective bin 106, which again may be stored within the container basket 501, can be picked up via remote operation of the coupler 1 and at least one of the first and second robotic segments 402,403. In the embodiment shown in the figures, this operation takes place when the container basket 501 has been placed in a pick-up position outside the access opening 502.

Note that the bins 106 designed to contain the totes 20 may stay within the container basket 501 at any time during operation or alternatively in the uppermost location within the storage column 105.

Figure 9:
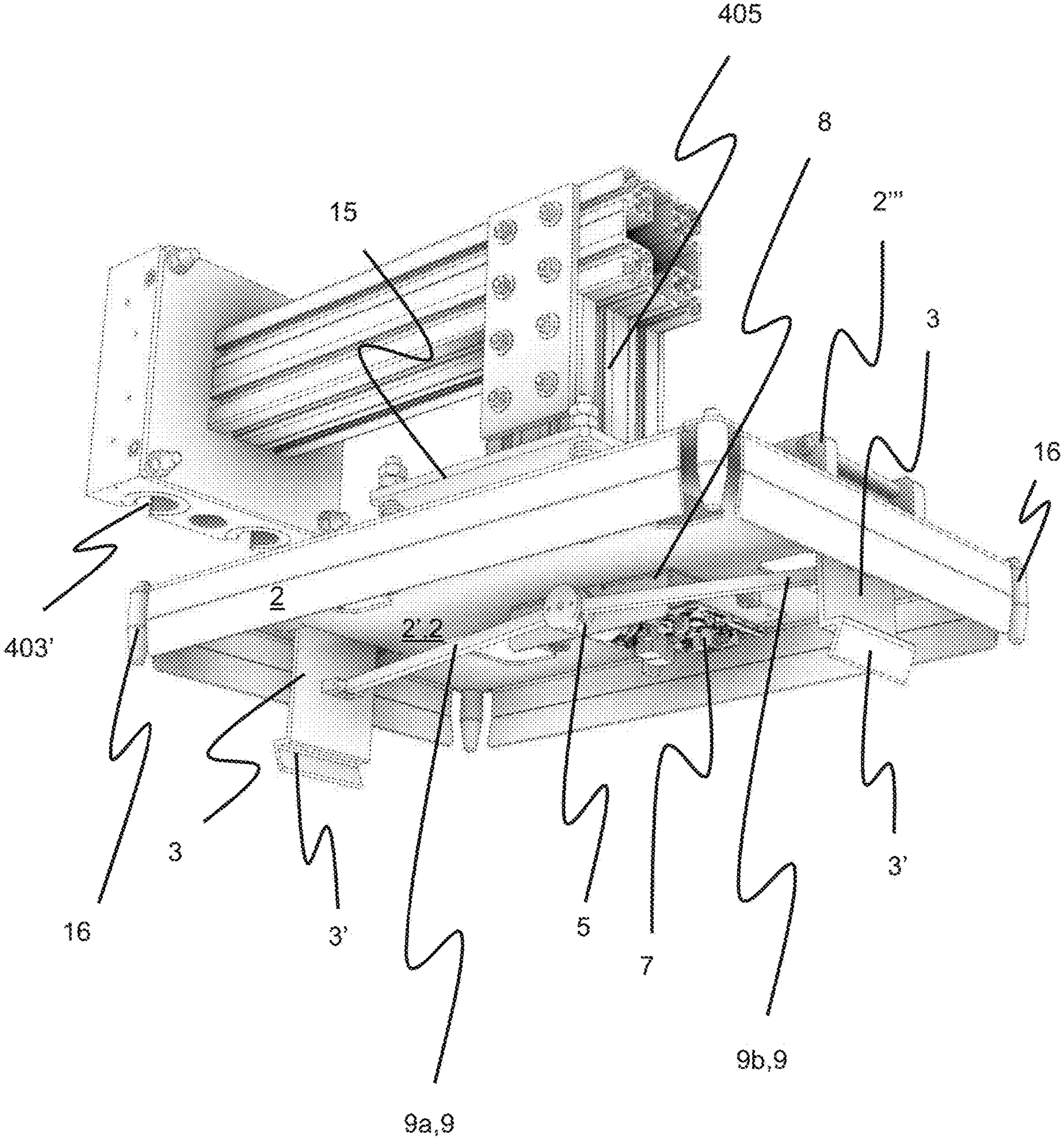
FIG. 9 is a perspective view of an operative end of a robotic picking device constituting part of the inventive product handling system of FIGS. 7 and 8 and an inventive coupler connected thereon.

FIG. 9 shows in further detail the operating end 405 of the robotic picking device 400 in accordance with the first embodiment, where the operating end 405 is fixed to the handle 15 of the coupler 1. Due to the vertical suspensions 15', the abutment of the coupler 1 with the upper rim 33 of the tote 20 does not create excessive force onto the operating end 405 and/or the tote 20.

With reference to the vertical displacement between the first and second robotic segments 402,403, the coupling structure at the end of the second robotic segment 403 remote of the operating end 405 is depicted with vertical oriented tracks 403' to ensure stable and precise vertical guidance along vertical rods of the first robotic segment 402.

Figure 11:
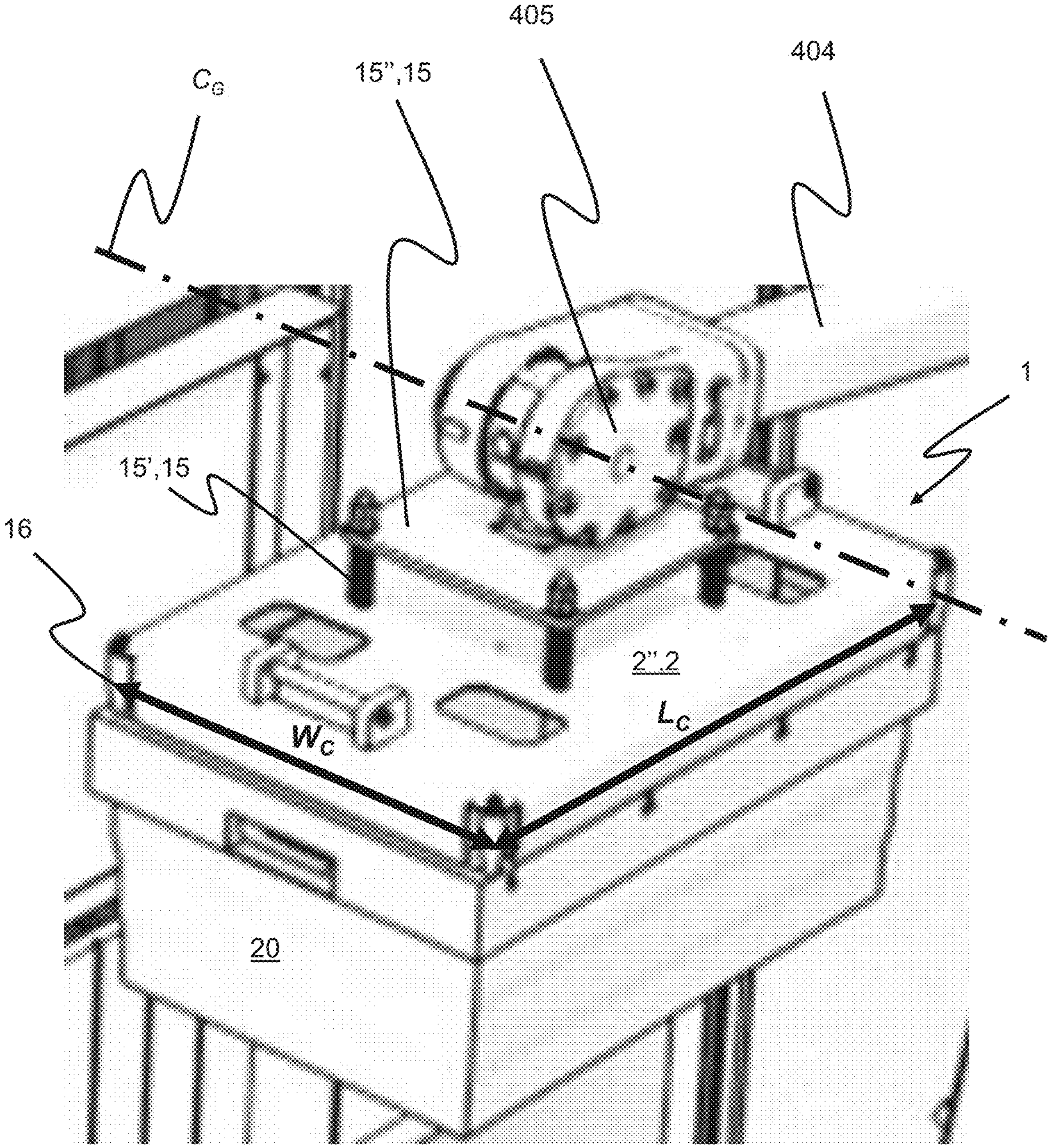
FIG. 11 is a perspective view of an operative end of a robotic picking device constituting part of the product handling system of FIG. 10 connected to a coupler.

FIGS. 10-11 show a second embodiment a product handling system using the above-mentioned coupler 1. The second embodiment is near identical to the first embodiment in structure and operation except the use of another type of robotic picking device 400, namely a multi-joint type robotic picking device.

The multi-joint robotic picking device 400 comprises a robotic base 401 connected to a fixed platform/floor 700, a first robotic segment 402 rotatable connected to the robotic base 401, preferably with a vertical rotational axis $C_{RB}$ oriented perpendicular to the platform/floor 700, a second robotic segment 403 rotatably connected to the first robotic segment 402, preferably with a horizontal rotational axis oriented parallel to the platform/floor 700, a third robotic segment 404 rotatably connected to the second robotic segment 403, an operative end/robotic gripper 405 forming part of, or being rotationally coupled to, the third robotic segment 403 and the coupler 1 as described above connected, preferably removably, to the operative end/robotic gripper 405.

All of the joints, i.e. the rotatable connection points described above, are equipped with remotely and/or autonomously operated rotary mechanisms, thereby allowing the multi-joint robotic picking device 400 to pick up a tote 20 with product items 80 from within a bin 106, and place the tote 20 onto the first conveyor belt 503*a* transporting the tote 20 away from the framework 101 of the storage and retrieval system 100. Likewise, the multi-joint configuration allows the robotic picking device 400 to pick an empty tote 20 from the second conveyor belt **503*b* transporting the tote 20 towards the framework 101 and place the empty tote 20 into the bin 106. In the configurations shown in the figures, the particular bin 106 is arranged inside the container basket 501**.

FIG. 11 shows in further details the connection of the coupler 1 with the operating end/robotic gripper 405.

In the preceding description, various aspects of the coupler for releasable coupling to a container, a product handling system using such a coupler, an automated storage and retrieval system and associated methods have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

| Reference numerals: | |
|---|---|
| 1 | Coupler |
| 2 | Coupler frame |
| 2a | Horizontal coupler plate |
| 2b | Angled coupler plate |
| 2' | Lower coupler frame face/lower face |
| 2" | Upper coupler frame face/upper face |
| 2'" | Upper end gripper block/upper block |
| 3 | Container gripper paddle/ Tote gripper paddle |
| 3a | First container gripper paddle/first paddle |
| 3b | Second container gripper paddle/ second paddle |
| 3' | Gripper protrusion |
| 3" | Upper end of gripper paddle/ upper end of tote paddle |
| 5 | Motor (for displacing gripper paddles 3) |
| 6 | Rotary disc (rotationally connected to motor 5) |
| 7 | Control system |
| 8 | Motor support/angle bracket |
| 9 | Gripper displacement means |
| 9a | First link |
| 9b | Second link |
| 15 | Handle/connection device |
| 15' | Resilient mechanism/vertical suspension |
| 15" | Handle plate |
| 16 | Delivery container sensor/tote abutment sensor |
| 17 | Container contacting face/tote contacting face |
| 20 | Delivery container/tote |
| 20' | Incoming delivery container/incoming tote |
| 21 | Gripping structure/formation within delivery container, recess/aperture |
| 22 | Opening frame of a delivery container/ rim/upper edge |
| 80 | Product items |
| 100 | Storage and retrieval system |
| 101 | Framework/storage grid |
| 102 | Upright members of framework structure |
| 105 | Storage column |
| 106 | Storage container/bin |
| 106' | Particular position of a storage container/ target storage container |
| 107 | Stack |
| 108 | Rail system |
| 110 | Parallel rails in first direction (X) |
| 111 | Parallel rail in second direction (Y) |
| 112 | Access opening |
| 119 | First port column/drop-off port column |
| 120 | Second port column/pick-up port column |

-continued

| Reference numerals: | |
|---|---|
| 200 | Container handling vehicle with cantilever |
| 201 | Vehicle body of the vehicle 200 |
| 202a | Drive means/wheel arrangement, first direction (X) |
| 202b | Drive means/wheel arrangement, second direction (Y) |
| 210 | Storage container lifting device |
| 300 | Container handling vehicle with internal cavity, occupying a single cell |
| 301 | Vehicle body of the vehicle 300 |
| 302a | Drive means/wheel arrangement, first direction (X) |
| 302b | Drive means/wheel arrangement, second direction (Y) |
| 350 | Container handling vehicle with internal cavity, occupying more than a single cell |
| 351 | Vehicle body of the vehicle 350 |
| 352a | Drive means/wheel arrangement, first direction (X) |
| 352b | Drive means/wheel arrangement, second direction (Y) |
| 360 | Storage container lifting device |
| 362 | Gripper element/claw |
| 400 | Robotic picking device |
| 401 | Robotic base |
| 402 | First robotic segment |
| 403 | Second robotic segment |
| 403' | Verticle tracks |
| 404 | Third robotic segment |
| 405 | Robotic gripper/operative end |
| 500 | Access and distribution station |
| 501 | Container support/container basket |
| 502 | Storage system access opening |
| 503 | Conveyor system |
| 503a | First conveyor belt |
| 503b | Second conveyor belt |
| 600 | Control system |
| 700 | Platform/floor |
| X | First direction |
| Y | Second direction |
| Z | Third direction |
| $C_{RB}$ | Rotational robotic base axis/vertical rotational axis |

The invention claimed is:

1. A coupler comprising:

a coupler frame comprising a lower coupler frame face and an upper coupler frame face, a handle protruding from the upper coupler frame face for releasable connection to an operative end of a robotic picking device, a first container gripper paddle and a second container gripper paddle, wherein the first and second container gripper paddles are connected to the coupler frame for releasable connection to a container and arranged at opposite sides a centre plane oriented perpendicular to the lower coupler frame face, wherein each of the container gripper paddles comprises a gripper protrusion located below the lower coupler frame face and an upper end pivotably connected to the coupler frame to pivot the gripper protrusions away from the lower coupler frame face for insertion into a corresponding recess or aperture accessible within an inner volume of the container, a container abutment face for abutting an opening rim of the container, and an actuator system for displacing the first and second container gripper paddles in opposite directions from the centre plane until the gripper protrusions have been removably inserted into the corresponding recesses or apertures, wherein the actuator system is arranged above the container abutment face.

2. The coupler in accordance with claim 1, wherein the actuator system comprises:

a motor, a control system, and a displacement mechanism interconnecting the motor and the container gripper paddles.

3. The coupler in accordance with claim 2, wherein the displacement mechanism comprises:

a first link connected at one end to the motor and the other end to one of the first and second container gripper paddles, and a second link connected at one end to the motor and the other end to the other of the first and second container gripper paddles, wherein the motor is configured to displace the first and second links.

4. The coupler in accordance with claim 3, wherein the displacement actuator further comprises:

a rotary element connecting the first and second links to a rotary shaft of the motor, wherein the motor, the rotary element and the first and second links are configured such that the opposite directed displacements are achieved by rotating the rotary element clockwise or counterclockwise between 0 degrees and 180 degrees.

5. The coupler in accordance with claim 1, wherein the lower coupler frame face is rectangular with a width and a length, and wherein the gripper protrusions are aligned on a centre axis parallel to the lower coupler frame face and centered along the width or length of the lower coupler frame face.

6. The coupler in accordance with claim 1, wherein the coupler further comprises:

a container sensor configured to sense when the lower coupler frame face is in contact with, and/or in proximity to, the opening rim of the container.

7. The coupler in accordance with claim 1, wherein the handle comprises a resilient mechanism allowing damping motion between the operative end of the robotic picking device and the coupler after connection.

8. A product handling system comprising:

a storage and retrieval system for storing storage containers, a control system, a robotic picking device in signal communication with the control system, the robotic picking device comprising:

a robotic base, a first robotic segment connected to the robotic base, an operative end, a coupler connected to the operative end, the coupler comprising:

a coupler frame comprising a lower coupler frame face and an upper coupler frame face, a handle protruding from the upper coupler frame face for releasable connection to an operative end of a robotic picking device, a first container gripper paddle and a second container gripper paddle, wherein the first and second container gripper paddles are connected to the coupler frame for releasable connection to a container and arranged at opposite sides a centre plane oriented perpendicular to the lower coupler frame face, wherein each of the container gripper paddles comprises a gripper protrusion located below the lower coupler frame face and an upper end pivotably connected to the coupler frame to pivot the gripper protrusions away from the lower coupler frame face for insertion into a corresponding recess or aperture accessible within an inner volume of the container, a container abutment face for abutting an opening rim of the container, an actuator system for displacing the first and second container gripper paddles in opposite directions from the centre plane until the gripper protrusions have been removably inserted into the corresponding recesses or apertures, wherein the actuator system is arranged above the container abutment face, and an access and distribution station configured to deliver a storage container from within the storage and retrieval system, wherein the robotic base is arranged at a distance to allow the operative end to be moved to a position at least within reach of the storage container is to be delivered to the access and distribution station.

9. The product handling system in accordance with claim 8, wherein the first robotic segment is rotatably connected to the robotic base with a rotational robotic base axis or movably connected to the robotic base along at least a direction parallel to a floor onto which the storage and retrieval system is supported or a combination thereof.

10. The product handling system in accordance with claim 8, wherein the access and distribution station comprises:

a storage system access opening through which a storage container may be transported between a storage location within the storage and retrieval system and an external area of the storage and retrieval system, and a conveyor having one end arranged adjacent to the storage system access opening, and wherein the robotic picking device is configured such that the operational end may be positioned at a location and an orientation allowing the coupler to retrieve a delivery container from within the storage container from the storage system access opening and that the retrieved delivery container may be placed onto the conveyor.

11. The product handling system in accordance with claim 8, wherein the storage and retrieval system comprises:

a framework structure comprising a plurality of vertical upright members defining a plurality of storage columns for storing stacks of storage containers and at least one port column for transporting a storage container to the access and distribution station, a rail system arranged on the framework structure, the rail system comprising perpendicular tracks, intersections of which form a grid having grid cells defining grid openings into the plurality of storage columns, and a remotely operated vehicle comprising drive means configured to travel along the rail system and a storage container lifting device for storing and retrieving storage containers through the grid openings.

12. A method for handling a delivery container by use of a product handling system in accordance with claim 8, wherein the method comprises:

A. moving the operative end of the robot picking device with the coupler to a position in which the coupler may connect to the delivery container, B. connecting the coupler to the delivery container and, C. raising the coupler with the delivery container connected thereto.

13. The method in accordance with claim 12, wherein the delivery container to be connected is stored within a storage container and wherein the method further comprises:

transporting, prior to step A, the storage container with the delivery container stored therein from the storage and retrieval system to an external area through a storage system access opening, and raising, during step C, the operative end such that a lowermost part of the delivery container is higher than an uppermost part of the storage container.

14. The method in accordance with claim 13, wherein the method further comprises:

placing, after step C, the delivery container onto a conveyor having one end arranged adjacent to the storage system access opening, and transporting the delivery container by use of the conveyor away from the storage system access opening.

15. The method in accordance with claim 12, wherein the method further comprises:

transporting an incoming delivery container to the storage system access opening, moving the operative end of the robotic picking device with the coupler to a position in which the coupler may connect to the incoming delivery container, connecting the coupler to the incoming delivery container, moving the incoming delivery container to a position above a storage container to be stored within the storage and retrieval system, and placing the incoming delivery container into the storage container.

* * * * *